(12) United States Patent
Nakamura et al.

(10) Patent No.: US 9,197,074 B2
(45) Date of Patent: Nov. 24, 2015

(54) CHARGING APPARATUS FOR ELECTRIC VEHICLE

(75) Inventors: Makoto Nakamura, Kanagawa (JP); Shuuji Nakamura, Kanagawa (JP)

(73) Assignee: ALPHA CORPORATION, Yokohama-shi, Kanagawa (JP)

( * ) Notice: Subject to any disclaimer, the term of this patent is extended or adjusted under 35 U.S.C. 154(b) by 311 days.

(21) Appl. No.: 13/808,668

(22) PCT Filed: Jun. 30, 2011

(86) PCT No.: PCT/JP2011/065030
§ 371 (c)(1),
(2), (4) Date: Jan. 7, 2013

(87) PCT Pub. No.: WO2012/005160
PCT Pub. Date: Jan. 12, 2012

(65) Prior Publication Data
US 2013/0106351 A1 May 2, 2013

(30) Foreign Application Priority Data

Jul. 9, 2010 (JP) .................................. 2010-156909

(51) Int. Cl.
*H02J 7/00* (2006.01)
*H02G 11/00* (2006.01)
*B60L 3/00* (2006.01)
(Continued)

(52) U.S. Cl.
CPC ................. *H02J 7/00* (2013.01); *B60L 3/0023* (2013.01); *B60L 3/0069* (2013.01); *B60L 3/04* (2013.01); *B60L 11/1818* (2013.01); *B60L 11/1824* (2013.01); *B60L 11/1825* (2013.01); *B60L 11/1846* (2013.01); *H02G 11/006* (2013.01); *H02G 11/02* (2013.01); *B60L 2230/12* (2013.01); *B60L 2240/36* (2013.01); *B60L 2270/32* (2013.01); *B60L 2270/34* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC ............................ G01B 21/06; B60L 2240/36
See application file for complete search history.

(56) References Cited

U.S. PATENT DOCUMENTS 4,475,163 A * 10/1984 Chandler et al. ............... 702/163
5,627,448 A * 5/1997 Okada et al. ................... 439/133
(Continued)

FOREIGN PATENT DOCUMENTS

CN   Y-201254109   6/2009
DE   42 12 207    10/1993
(Continued)

*Primary Examiner* — Drew A Dunn
*Assistant Examiner* — Christopher Nettles
(74) *Attorney, Agent, or Firm* — Drinker Biddle & Reath LLP (57) ABSTRACT

A charging apparatus for an electric vehicle is provided with: a charging cable including a proximal end connected to a main body, a connector provided on a distal end, and an extra length absorbing section provided between the distal end and the proximal end; a measuring section configured to detect an elongation of the charging cable from an initial length thereof; and an electric current control section configured to start applying an electric current to the charging cable under a condition that an elongation of the charging cable exceeding a threshold value is detected by the measuring section.

9 Claims, 5 Drawing Sheets

(51) Int. Cl.
   *B60L 11/18* (2006.01)
   *H02G 11/02* (2006.01)
   *B60L 3/04* (2006.01)

(56) References Cited

U.S. PATENT DOCUMENTS

| | | | |
|---|---|---|---|
| 7,263,782 B2* | 9/2007 | Steinich | 33/732 |
| 2006/0257086 A1* | 11/2006 | Ohsono et al. | 385/123 |
| 2009/0043450 A1 | 2/2009 | Tonegawa et al. | |
| 2010/0241299 A1* | 9/2010 | Ito et al. | 701/22 |
| 2010/0301802 A1* | 12/2010 | Iida | 320/109 |

FOREIGN PATENT DOCUMENTS

| | | | |
|---|---|---|---|
| JP | 2003-244832 | | 8/2003 |
| JP | 2003244832 A | * | 8/2003 |
| JP | 2007064858 A | * | 3/2007 |
| JP | 2007-252016 | | 9/2007 |
| WO | 2007/105579 | | 9/2007 |

* cited by examiner

CHARGING APPARATUS FOR ELECTRIC VEHICLE

TECHNICAL FIELD

The invention relates to a charging apparatus for an electric vehicle.

BACKGROUND ART

Charging of an electric vehicle using a charging apparatus is performed by connecting the charging apparatus with the electric vehicle by a charging cable, as described, for example, in Patent Document 1. A structure for preventing an accident due to heat generation on the charging cable, such as those as described in Patent Document 2, is known.

PRIOR ART DOCUMENTS

Patent Documents

Patent Document 1: JP 2007-252016 A
Patent Document 2: JP 2003-244832 A

According to the structure described in Patent Document 2, the charging cable is housed in a state of being wound around a drum to improve storability thereof. A wound amount of the charging cable is observed by a cord sensor adapted to check an outermost wound position, and an electric current applied to the charging cable is increased or decreased depending on the wound amount, thereby preventing a dissolution loss of the charging cable due to heat generation.

However, according to the structure described in Patent Document 2, there may be a case that a longer charging time than that expected is taken due to such adjustment of the charging current, thereby having a poor usability. Also, the structure can be applied to only when the charging cable is wound, thereby having an inferior generality.

SUMMARY OF INVENTION

Embodiments of the present invention provide a charging apparatus for an electric vehicle, in which a dissolution loss of a charging cable or the like are securely prevented and also a usability thereof is not deteriorated.

In accordance with one or more embodiments of the invention, a charging apparatus for an electric vehicle may include: a charging cable 4 including a proximal end connected to a main body 1, a connector 2 provided on a distal end, and an extra length absorbing section 3 provided between the distal end and the proximal end; a measuring section 5 configured to detect an elongation of the charging cable 4 from an initial length thereof; and an electric current control section 6 configured to start applying an electric current to the charging cable 4, under a condition that an elongation of the charging cable 4 exceeding a threshold value is detected by the measuring section 5.

The other features and advantages of the present invention will become apparent from the description of embodiments and the appended claims.

BRIEF DESCRIPTION OF DRAWINGS

FIGS. 1(a) to 1(c) are views showing a first example of embodiments, wherein

FIGS. 2(a) and 2(b) are views showing a detecting switch according to the first example, wherein

FIGS. 3(a) and 3(b) are views showing a modification of the first example, wherein

DESCRIPTION OF EMBODIMENTS

According to embodiments of the present invention, a charging apparatus may include a charging cable 4 including a proximal end connected to a main body 1, a connector 2 (i.e., a wiring connector 2) provided on a distal end thereof, and an extra length absorbing section 3 provided between the distal end and the proximal end; a measuring section 5 configured to detect an elongation of the charging cable 4 from an initial length thereof; and an electric current control section 6 configured to start applying an electric current to the charging cable 4, under the condition that the elongation of the charging cable 4 exceeding a threshold value thereof has been detected by the measuring section 5.

The charging cable 4 is set to have an extra length to allow a wiring connector 2 to be moved to an electric power receiving section 15a of an electric vehicle 15, when the wiring connector 2 is disposed at a certain initial position. The extra length is absorbed in the extra length absorbing section 3 formed in a coiled shape, a curled shape, a serpentine shape or the like. When the extra length is densely absorbed in the extra length absorbing section 3 and the charging cable 4 is entangled, this is a cause of heat generation due to generation of Joule's heat caused by an internal resistance or an electronic action and due to reduction of heat radiation efficiency caused by an overlapping.

The extra length absorbing section 3 of the charging cable 4, which causes such a problem when an electric current is applied, is generally eliminated as the wiring connector 2 is further spaced away from the main body 1, and at the same time, the cause of heat generation is also eliminated. Therefore, a risk of heat generation can be predicted to a certain extent by detecting an elongation of the charging cable 4 from the initial length thereof.

According to embodiments, an essential requirement for starting applying an electric current may be that a measured result of the elongation of the charging cable 4 from the initial length which is measured by the measuring section 5 exceeds a predetermined value, i.e., a value at which elimination of a harmfully extra-length-absorbed state can be expected. Accordingly, applying of an electric current is securely prevented in such a state of having a poor thermal condition, thereby improving safety during charging.

When a domestic power supply is used as a charging power source 16 to charge the electric vehicle 15, applying of an electric current is performed for a relatively long time under an unmanned environment. Therefore, a time at which a fault is caused by heat generation may be lately found, thereby causing an accident, such as a fire due to the heat generation. However, according to embodiments, such an accident can be completely eliminated, because applying of an electric current is not performed in a state under a risk, such as damage of an insulation coating due to the heat generation.

Also, the elimination of a dense state in the extra length absorbing section 3 is set as a requirement for starting applying an electric current and a value of an applied electric current is not lowered as in the related art disclosed in Patent Document 2 described above. As a result, deterioration of usability, such that a charging time is extended longer than that expected due to charging using a lower electric current value, is not caused.

As the measuring section 5, for example, an optical sensor or the like may be used.

The charging apparatus may include a charging cable 4 connected to a main body 1 and having a wiring connector 2 at a distal end thereof; a measuring cable 7 connected at one end thereof to one of both sides of the charging cable 4, between which the extra length absorbing section 3 is disposed, and arranged along the charging cable 4 over a shorter length than the extra length in the extra length absorbing section 3; a detecting switch 9 for detecting a detected portion 8 provided on a moving end of the measuring cable 7 when a pass length of the measuring cable 7 reaches a predetermined threshold value; and an electric current control section 6 for starting applying an electric current to the charging cable 4, on the necessary condition that the detecting switch 9 has detected the detected portion 8. According to this structure, elimination of the extra length absorbing section 3 of the charging cable 4 can be more exactly decided.

Figure 5:
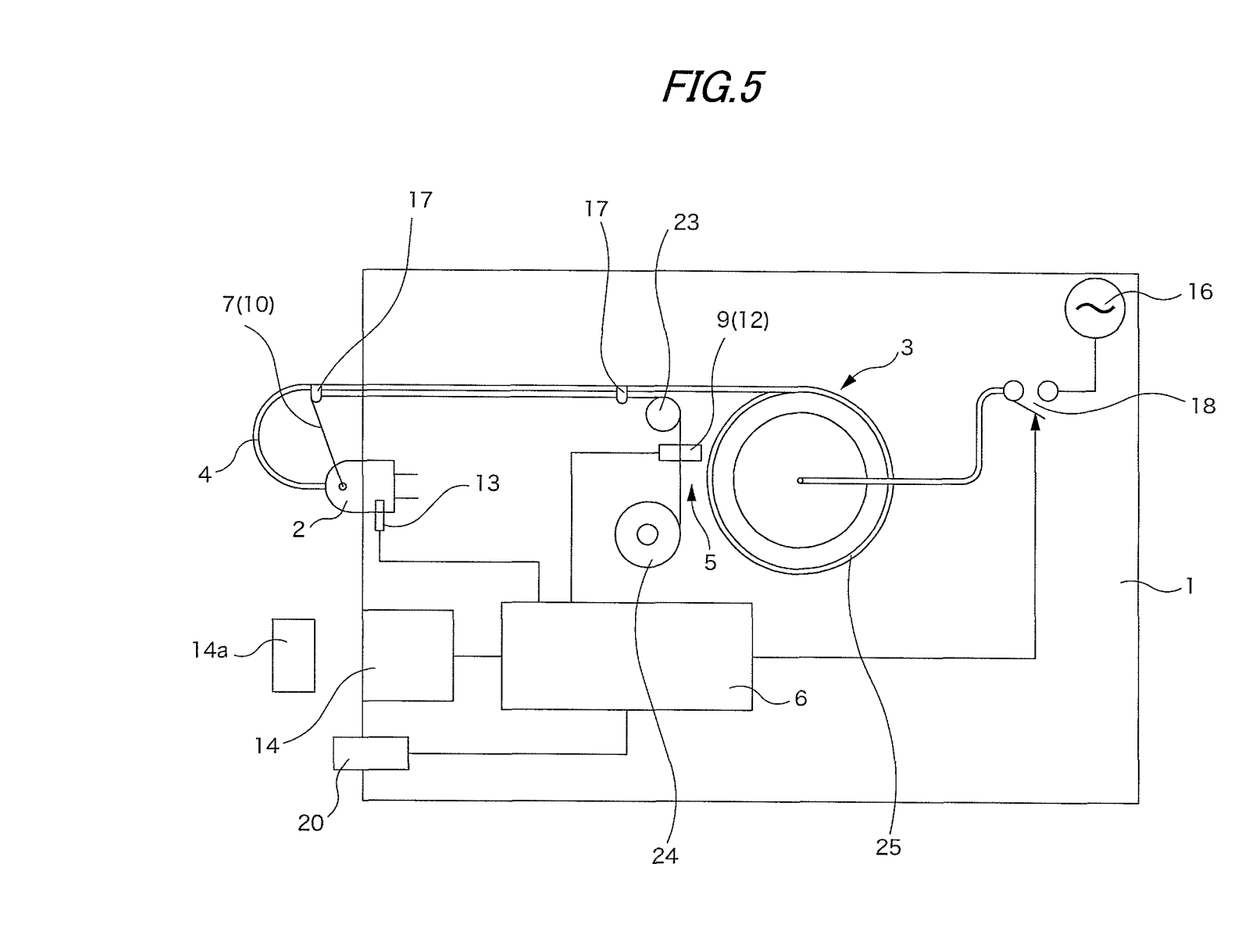
FIG. 5 is a view showing a modification of the second example.

One end of the measuring cable 7 may be connected to one side of the charging cable 4 between which the extra length absorbing section 3, such as a curled section formed by curling a cord, a folded section formed by folding a cord, or a wound section formed by winding a cord, is disposed, and the other end of the measuring cable 7 may be arranged as a moving end along the charging cable 4. For example, when the charging cable 4 is a curled cord, the measuring cable 7 may be arranged by inserting the measuring cable 7 into and through a center of the curled section. If it is not the curled cord, the measuring cable 7 may be inserted into and through cable guide members 17 fixed at suitable locations on the charging cable 4 as shown in FIG. 5, or inserted into and through curl portions formed at suitable locations on the charging cable 4.

For example, when the extra length absorbing section 3 is formed as the curled section, a pass of the measuring cable 7 passing the extra length absorbing section 3 may be set on a straight path passing the center of the curled section 3. If the extra length absorbing section 3 is a curved path, a folded section, or a wound section having a suitable extra length, the pass of the measuring cable 7 may be set on a path passing the extra length absorbing section 3 over a shorter length than the extra length of the charging cable 4, such as a bended path passing suitable locations in the folded section guided by the cable guide members 17.

The detected portion 8 may be provided on a side of the moving end of the measuring cable 7. The detected portion 8 may be moved, as a connecting end of the measuring cable 7 to the charging cable 4 is moved to eliminate the extra length absorbing section 3 of the charging cable 4, and the detecting switch 9 may detect a position of the detected portion 8 when an elongation of the charging cable 4 from the initial length thereof exceeds a predetermined threshold value. For example, the detecting switch 9 may be configured as an open terminal adapted to be shorted by the detected portion 8 formed of a shorting terminal, or as a micro switch adapted to be switched on by a passage of the moving end formed in a protruded shape or the like.

The measuring cable 7 may, for example, be applied when the curled portion 3 is, for example, meandered or the like to eliminate the extra length, while the wiring connector 2 is disposed adjacent to the main body 1, in addition to serving as the measuring section 5, i.e., a means for measuring a distance of the wiring connector 2 from the main body 1.

Also, the charging apparatus may additionally include a second measuring cable 10 connected at one end thereof to one of both sides of the charging cable 4, between which the extra length absorbing section 3 is disposed, and arranged along the charging cable 4 over a shorter length than the extra length in the extra length absorbing section 3; and a second detecting switch 12 for detecting a second detected portion 11 provided on a moving end of the second measuring cable 10 when a pass length of the second measuring cable 10 reaches a predetermined threshold value. In this case, the electric current control section 6 stops applying an electric current to the wiring connector 2, under the condition that the second detecting switch 12 has detected the second detected portion 11.

If a detect timing of the second detecting switch 12 is set by a dimension being able to absorb an extra length required to prevent a load on the charging cable 4, supplying of an electric current can be stopped before an interruption is caused due to an overload on the charging cable 4. Therefore, a damage to the charging apparatus or the vehicle due to such an instantaneous interruption and an electric shock accident due to exposure of a lead wire, on which an electric voltage is applied, can be securely prevented.

In addition, the charging apparatus may additionally include a lock unit 13 for locking the wiring connector 2 to the main body 1 to regulate a detachment of the wiring connector 2 from the main body 1; and an identification unit 14 for unlocking the lock unit 13 by an identification establishment, thereby limiting users.

The identification unit 14 may be configured as an identification unit 14 with respect to a key code signal transmitted from a cylinder lock operated by a locking/unlocking key used upon locking/unlocking of a door lock of the vehicle or from a mobile-phone type transmitter for operating the door lock, in addition to an identification number checking unit, a bio-identification unit 14 or the like.

According to embodiments, a dissolution loss of the charging cable 4 and the like are securely prevent and also usability thereof is not deteriorated.

EXAMPLES OF EMBODIMENTS

With reference to the drawings, a plurality of examples of the embodiments and modifications thereof will be described. However, the examples and modifications are exemplars of the present invention but not to limit the present invention, and accordingly, all features described in the examples and modifications and combinations thereof are not necessarily essential to the present invention.

First Example

Figure 1A:
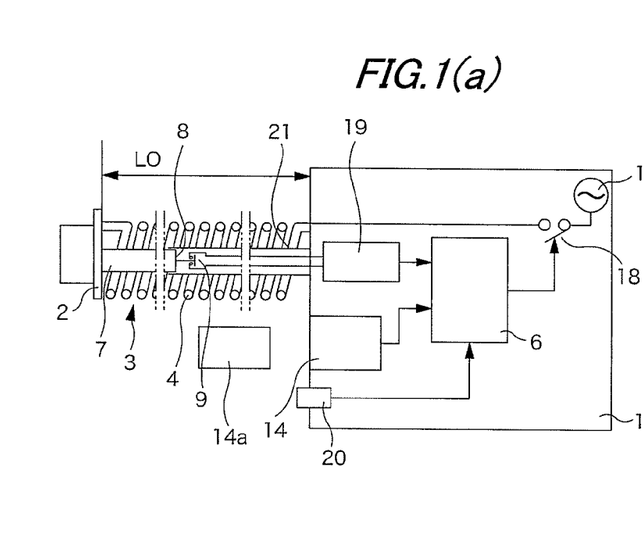
FIG. 1(a) shows a charging apparatus when an electric current is not applied thereto.
Figure 1B:
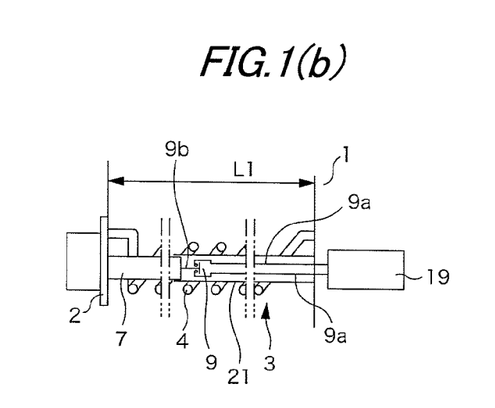
FIG. 1(b) shows the charging apparatus when an extra length in a measuring section is eliminated.
Figure 1C:
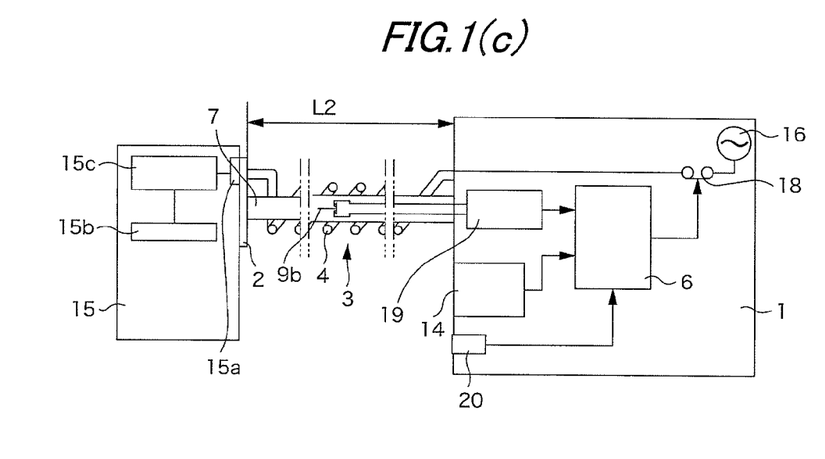
FIG. 1(c) shows the charging apparatus when the electric current is applied thereto.

FIGS. 1(*a*) to 1(*c*), 2(*a*) and 2(*b*) show a first example of the embodiments. A charging apparatus includes a main body 1, a charging cable 4 having a proximal end connected to the main body 1, and a measuring section 5.

For the charging cable 4, a curled cord having a curled section (i.e., an extra length absorbing section 3) keeping a curled shape in an unloaded state is used, and a wiring connector 2 is provided on a distal end thereof. An electric vehicle 15 has a battery 15*b* mounted therein, and charging for the battery 15b is performed by supplying an electric current to the electric vehicle 15 in a state of connecting the wiring connector 2 to an electric power receiving section 15a of the electric vehicle 15 and by carrying AC/DC conversion in a charging control section 15c. As the wiring connector 2, a plug, a socket, a charging paddle and the like may be used.

The main body 1, in which a commercial power supply used as a charging power source 16 is incorporated, has an electric current switch 18 constituted of a relay or a semiconductor relay for interrupting/connecting a wiring path to the charging cable 4, and the electric current switch 18 is switched on or off depending on a relay driving signal outputted from an electric current control section 6.

Also, the main body 1 has a switch detecting section 19, an identification unit 14 and a checking switch 20. When all conditions with respect to a detection of a switch-on signal in the switch detecting section 19, an identification establishment in the identification unit 14, and a detection of pushing operation in the checking switch 20 are satisfied, the electric current control section 6 drives the electric current switch 18 to be closed, thereby starting applying an electric current. As the identification unit 14, a RFID (Radio Frequency Identification) reader, for which a card-typed RFID 14a is employed as a subject to be identified, is used.

Figure 2A:
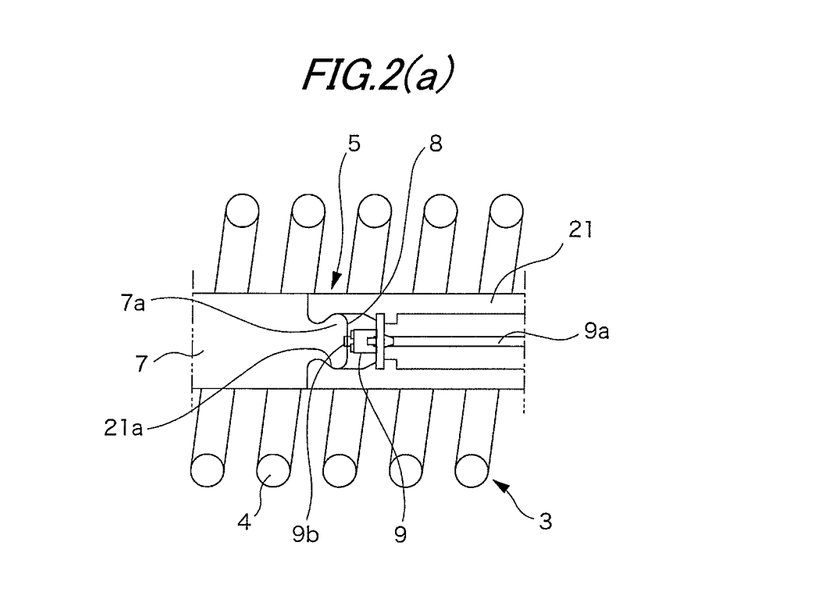
FIG. 2(a) shows the detecting switch when a detection is not effected.
Figure 2B:
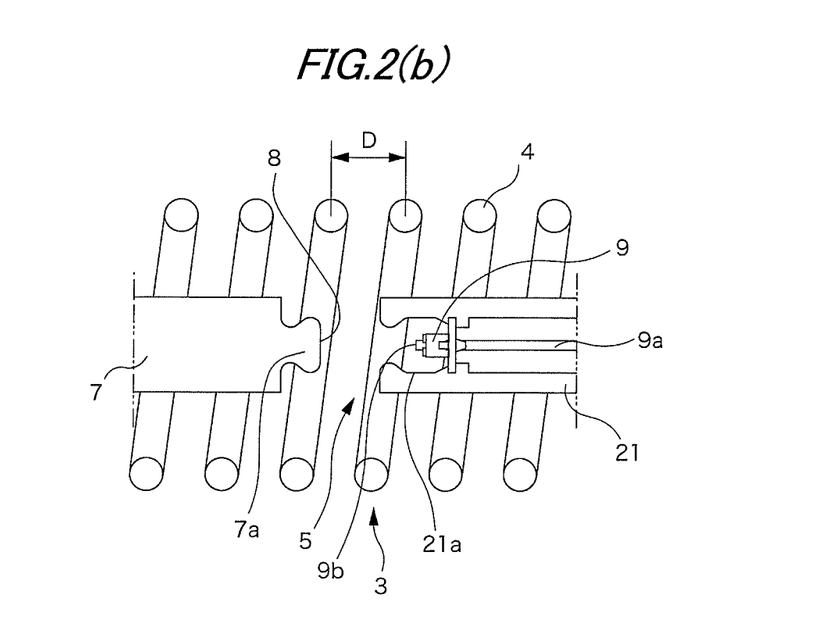
FIG. 2(b) shows the detecting switch when a detection is effected.

As shown in FIGS. 1 and 2, the measuring section 5 includes a measuring cable 7 connected at one end thereof to the wiring connector 2 and inserted into and through the curled section 3, and a hollow-shaped cable receiving portion 21 fixed at one end thereof to the main body 1 and inserted into and through the curled section 3. In other words, the measuring cable 7 is connected to the distal end of the charging cable 4, and the cable receiving portion 21 is provided on the proximal end of the charging cable 4. A tactile switch (i.e., a detecting switch 9) is fixed on a distal end of the cable receiving portion 21, and a lead 9a of the tactile switch 9 extends through the hollow portion and is connected to the switch detecting section 19.

A fitting recess 21a is formed on the distal end of the cable receiving portion 21. A fitting protrusion 7a formed on the distal end of the measuring cable 7 is fitted therein. The fitting protrusion 7a and the fitting recess 21a are connected to each other in a fitting strength being able to prevent such a fitted-in state from being unintentionally removed, and in the connected state, a tip (i.e., a detected portion 8) of the fitting protrusion 7a pushes an operating button 9b of the tactile switch 9, thereby keeping the tactile switch 9 in a switched-off state.

In the connected state between the fitting recess 21a and the fitting protrusion 7a, the measuring cable 7 and the cable receiving portion 21 have a suitable flexibility on the whole, thereby properly bending, depending on a motion of the wiring connector 2.

In an initial state show in FIG. 1(a), i.e., a state in which the charging apparatus is not being used, the wiring connector 2 is kept at an initial position, at which the wiring connector 2 is spaced away from the main body 1 by a suitable distance (L0), by being engaged in the main body 1 or the like. In this state, gaps between curls in the extra length absorbing section 3 are closed in consideration of efficient extra length absorption, and also an extra length is set on either one or both of the measuring cable 7 and the cable receiving portion 21 inserted into and through the curled section 3.

In this state, when the wiring connector 2 is approached to the vehicle 15 to charge the vehicle 15, the distance between the wiring connector 2 and the main body 1 is increased, and at the same time, gaps between the curls are opened, thereby eliminating an extra length to a certain extent. Accompanying to the elimination of the extra length, extra lengths on the measuring cable 7 and the like are properly eliminated. As a result, when the distance (L1) between the wiring connector 2 and the main body 1 becomes a predetermined value, and specifically gaps (D) between the curls are sufficiently widened to become a distance in which harmful problems due to a temperature increase in the charging cord, such as a dissolution loss of an insulation coating, are not caused even if applying an electric current for a long time, extra lengths in the measuring cable 7 and the like are completely eliminated as shown in FIG. 1(b).

Subsequently, when the wiring connector 2 is further spaced away from the main body 1 (a distance L2), a tension acts between the measuring cable 7 and the cable receiving portion 21, and thus the fitted-in state between the fitting recess 21a and the fitting protrusion 7a is removed as shown in FIG. 2(b). As the fitting protrusion 7a is separated from the fitting recess 21a, pressing of the detected portion 8 against the operating button 9b of the tactile switch 9 is removed, and thus the tactile switch 9 is transited in a switched-on state.

Such a state of the tactile switch 9 is detected by the switch detecting section 19, and when being in the switched-on state, a measurement result flag of the electric current control section 6 is set up.

According to the first example, charging to the vehicle 15 is performed by connecting the wiring connector 2 to the electric power receiving section 15a of the vehicle 15 and in addition, carrying a predetermined identification operation and pushing the checking switch 20. When a distance between the vehicle 15 to be charged and the main body 1 is reasonable, the tactile switch is switched on with the wiring connector 2 connected to the electric power receiving section 15a of the vehicle 15 as shown in FIG. 1(c), and thus the measurement result flag of the electric current control section 6 is set up.

In addition to connection of the charging cable 4 to a suitable position, when an identification in the identification unit 14 is established and the checking switch 20 is pushed, all conditions required for applying of an electric current in the electric current control section 6 are satisfied. Therefore, the electric current control section 6 closes the electric current switch 18, thereby starting charging.

Contrarily, if any one of conditions described above is not satisfied, applying of an electric current to the charging cable 4 cannot be started. In particular, because applying of an electric current is controlled depending on whether or not the measurement result flag is present, the electric current cannot be applied when the curled section 3 is dense and a risk of causing heat generation and the like due to applying of the electric current for a long time is present, thereby preventing an accident during charging.

As described above, according to the first example, the measuring section 5 is configured to detect an elongation of the charging cable 4 from an initial length thereof, and the detecting switch 9 of the measuring section 5 is configured to be switched on by the elongation of the charging cable 4 exceeding a threshold value thereof. Also, the electric current control section 6 is configured to start applying an electric current to the charging cable 4, under the condition that the elongation of the charging cable 4 exceeding the threshold value has been detected by the measuring section 5.

<Modification of First Example>

Figure 3A:
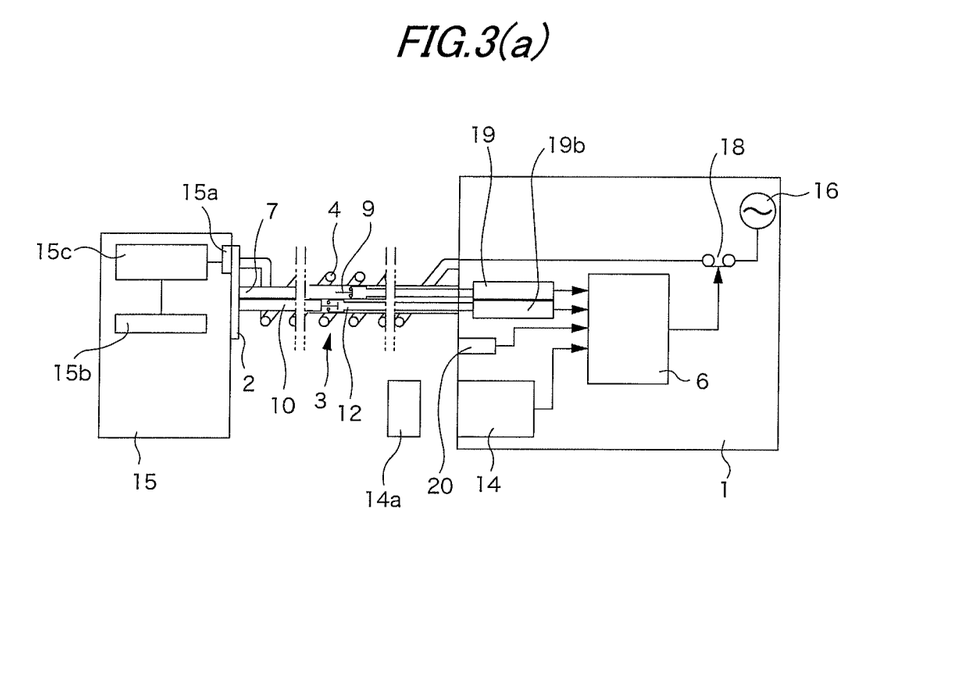
FIG. 3(a) is a schematic view of the modification of the first example.
Figure 3B:
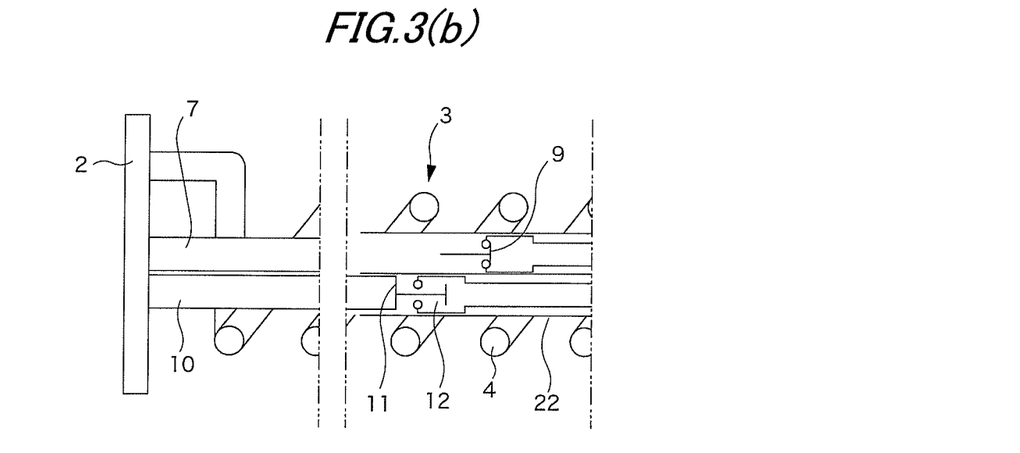
FIG. 3(b) is an enlarged view of a main part in FIG. 3(a).

FIGS. 3(a) and 3(b) show a modification of the first example. Meanwhile, components as substantially identical to the first example are designated by identical reference numerals designate in the drawings and the detailed descriptions thereof will not be omitted.

According to the modification of the first example, a second measuring cable 10, a second cable receiving portion 22, a tactile switch (i.e., a second detecting switch 12), and a second switch detecting section 19b for observing the second detecting switch 12 are added to the charging apparatus of the first example. The second measuring cable 10, the second cable receiving portion 22 and the second detecting switch 12 are respectively configured to be identical to the measuring cable 7, the cable receiving portion 21 and the detecting switch 9. The second measuring cable 10 and the second cable receiving portion 22 are dimensioned greater than the measuring cable 7 and the cable receiving portion 21. To be exact, the second measuring cable 10 and the second cable receiving portion 22 are dimensioned to be operated when the wiring connector 2 is further spaced away from the main body 1 beyond an operation position of the measuring section 5 until the charging cable 4 is tensioned, as absorbing of the extra length of the charging cable 4 is progressed. Namely, the second measuring cable 10 is connected to the distal end of the charging cable 4, the second cable receiving portion 22 is provided on the proximal end of the charging cable 4, the second detecting switch 12 is provided on a distal end of the second cable receiving portion 22 and the second detecting switch 22 is operated when the second measuring cable 10 and the second cable receiving portion 22 are disconnected by an elongation of the charging cable 4 exceeding a second value more than the threshold value thereof. Also, the electric current control section 6 stops applying an electric current to the charging cable 4, when the second detecting switch 12 detects the elongation of the charging cable 4 exceeding the second value.

Thus, according to the modification, when the wiring connector 2 is connected to the electric power receiving section 15a of the vehicle 15 parked in a suitable location, the measuring section 5 is operated as described above and the state of applying an electric current is maintained if other conditions are satisfied. In this state, when the wiring connector 2 is further spaced away from the main body 1 as the vehicle 15 starts to move unintentionally, or when the charging cable 4 is caught by a person's foot to increase pass lengths of the second cable receiving portion 22 and the second measuring cable 10 even if the wiring connector 2 is not moved, the second detecting switch 12 is operated, there stopping charging.

Second Example

Figure 4:
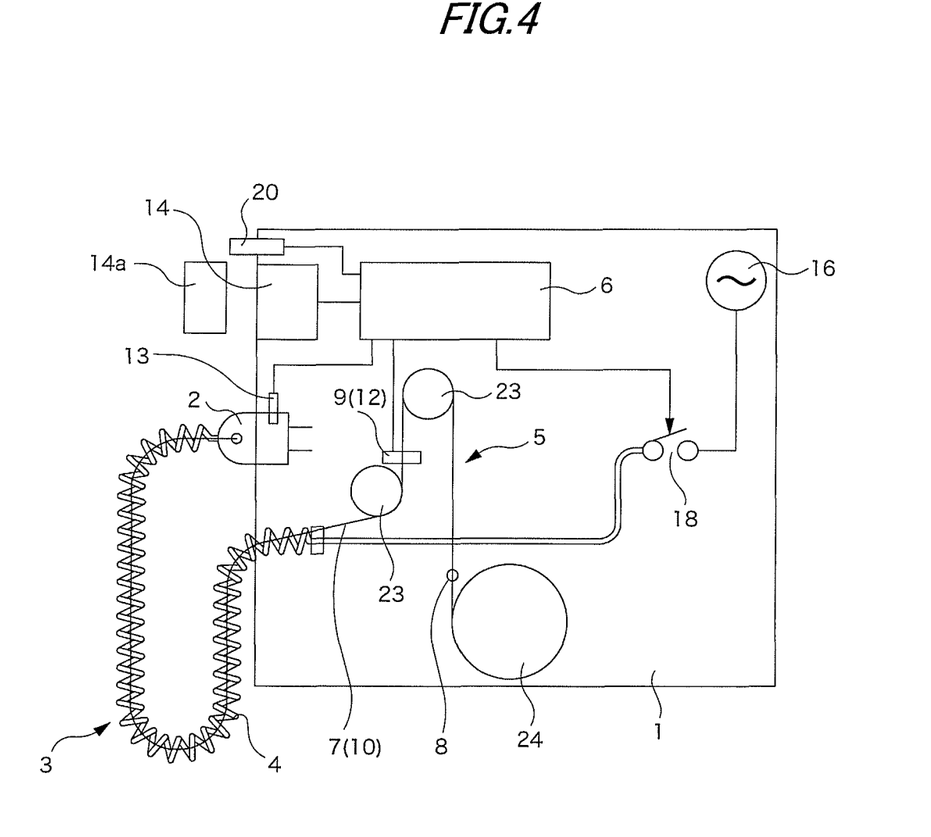
FIG. 4 is a view showing a second example of the embodiment.

FIG. 4 shows a second example of the embodiments. A charging apparatus of the second example has a lock unit 13. The lock unit 13 locks inseparably the wiring connector 2 to the main body 1, and identification establishment in the identification unit 14 is required to unlock the locked state.

As a result, when the card typed RFID 14a being able to be identified by the identification unit 14 is not carried, the wiring connector 2 cannot be separated. Therefore, it is possible to limit the use right for the charging apparatus.

Also, according to the second example, the measuring cable 7 is fixed at one end thereof to the wiring connector 2 (i.e., the distal end of the charging cable 4), and at the other end, after being inserted into and through the curled section 3, wound onto a cable drum 24 by guiding a running direction thereof by pulleys 23. A biasing force in a direction of winding the measuring cable 7 is exerted to the cable drum 24 by a spiral spring, and thus the measuring cable 7 is tensioned such that the measuring cable 7 can pass through a shortest path.

Also, the detected portion 8 is provided at a suitable location on the measuring cable 7, and the detecting switch 9 is configured to detect a passage of the detected portion 8. The detected portion 8 may be formed in a protruded shape, and the detecting switch 9 may be configured as a switch adapted to be operated when the detected portion 8 is passed therethrough.

In addition, a second detected portion 11 is formed on the measuring cable 7 (in a state shown in FIG. 4, the second detected portion 11 is located on a portion of the measuring cable 7 which is wound on the cable drum 24, and accordingly, the second detected portion 11 is not shown in FIG. 4). Like the detected portion 8, the second detected portion 11 may be formed as a protrusion on the measuring cable 7, and the detecting switch 9 may be configured to detect the second detected portion 11 by a second operation, after detecting the detected portion 8.

Therefore, according to the second example, the measuring cable 7 acts also as the second measuring cable 10, and the detected portion 8 and the detecting switch 9 act also respectively as the second detected portion 11 and the second detecting switch 12. Also, the detection of the detected portion 8 allows applying of an electric current and the detection of the second detected portion 11 stops applying an electric current.

<Modification of Second Example>

FIG. 5 shows a modification of the second example. According to the modification, the charging cable 4 is contained by being wound on a winding reel 25 to which a biasing force in a winding direction is exerted by a spiral spring and the like. To regulate applying of an electric current when absorption of the extra length in a portion wounded by the winding reel 25, which corresponds to the extra length absorbing section 3, i.e., the number of turns wound is excessive, the measuring cable 7 is formed in the same way as that of the second example and act also as the second measuring cable 10.

Also, because the charging cable 4 does not have a curled section for absorbing the extra length, the measuring cable 7 is arranged along the charging cable 4 using cable guides (not shown) formed on cable guide members 17 fixed at suitable locations on the charging cable 4.

According to a plurality of examples of the embodiments and modifications thereof as described above, a charging apparatus for an electric vehicle may include a charging cable 4 including a proximal end connected to a main body 1, a connector 2 provided on a distal end thereof, and an extra length absorbing section 3 provided between the distal end and the proximal end; a measuring section 5 configured to detect an elongation of the charging cable 4 from an initial length thereof; and an electric current control section 6 configured to start applying an electric current to the charging cable 4, under the condition that an elongation of the charging cable 4 exceeding a threshold value thereof has been detected by the measuring section 5.

The measuring section 5 may includes a measuring cable 7 connected to the distal end of the charging cable 4, and a detecting switch 9 configured to be switched on by the elongation of the charging cable 4 exceeding the threshold value.

The measuring section 5 may further includes a cable receiving portion 21 provided on the proximal end. The detecting switch 9 may be provided on a distal end of the cable receiving portion 21. The detecting switch 9 may be configured to be switched on when the measuring cable 7 and the cable receiving portion 21 are disconnected by the elongation of the charging cable 4 exceeding the threshold value.

Also, the charging apparatus may further includes a second measuring cable 10 connected to the distal end of the charging cable 4, and a second detecting switch 12 configured to detect an elongation of the second measuring cable 10. The electric current control section 6 may be configured to stop applying an electric current to the charging cable 4, under the condition that an elongation of the charging cable 4 exceeding a second value more than the threshold value has been detected by the second detecting switch 12.

Also, the charging apparatus may further includes a second cable receiving portion 22 provided on the proximal end of the charging cable 4. The second detecting switch 12 may be provided on a distal end of the second cable receiving portion 22. The second detecting switch 12 may be operated when the second measuring cable 10 and the second cable receiving portion 22 are disconnected by the elongation of the charging cable 4 exceeding the second value.

A detected portion 8 may be provided on the measuring cable 7. The detecting switch 9 may be configured to detect a movement of the detected portion 8 passing through the detecting switch 9 due to the elongation of the charging cable 4 exceeding the threshold value.

A second detected portion 11 may be provided on the measuring cable 7. The detecting switch 9 may be configured to detect a movement of the second detected portion 11 passing through the detecting switch 9 due to an elongation of the charging cable 4 exceeding a second value more than the threshold value. The electric current control section 6 may be configured to start applying an electric current to the charging cable 4 under the condition that the movement of the detected portion 8 passing through the detecting switch 9 has been detected, and to stop applying an electric current to the charging cable 4 under the condition that the movement of the second detected portion 11 passing through the detecting switch 9 has been detected.

In addition, the charging apparatus may further include a lock unit 13 for locking the connector 2 to the main body 1 to regulate a detachment of the connector 2 from the main body 1, and an identification unit 14 for unlocking the lock unit by an identification establishment.

DESCRIPTION OF REFERENCE NUMERALS

1. Main Body
2. Wiring Connector
3. Extra Length Absorbing Section
4. Charging Cable
5. Measuring Section
6. Electric Current Control Section
7. Measuring Cable
8. Detected Portion
9. Detecting Switch
10. Second Measuring Cable
11. Second Detected Portion
12. Second Detecting Switch
13. Lock Unit
14. Identification Unit

The invention claimed is:

1. A charging apparatus for an electric vehicle, the charging apparatus comprising:
   a charging cable including a proximal end connected to a main body, a connector provided on a distal end and adapted to be connected to an electric power receiving section of the electric vehicle, and an extra length absorbing section provided between the distal end and the proximal end;
   a measuring section configured to detect an elongation of the charging cable from an initial length thereof; and
   an electric current control section configured to start applying an electric current to the charging cable, when under a condition that the elongation of the charging cable exceeding a threshold value is detected by the measuring section.

2. The charging apparatus according to claim 1, wherein the measuring section includes a measuring cable connected to a side of the distal end of the charging cable, and a detecting switch configured to be switched on by the elongation of the charging cable exceeding the threshold value.

3. The charging apparatus according to claim 2, wherein the measuring section further includes a cable receiving portion provided on a side of the proximal end;
   wherein the detecting switch is provided on a distal end of the cable receiving portion; and
   wherein the detecting switch is configured to be switched on by a disconnection between the measuring cable and the cable receiving portion due to the elongation of the charging cable exceeding the threshold value.

4. The charging apparatus according to claim 1, further comprising:
   a second measuring cable connected to a side of the distal end of the charging cable; and
   a second detecting switch configured to detect an elongation of the second measuring cable;
   wherein the electric current control section is configured to stop applying an electric current to the charging cable, under a condition that an elongation of the charging cable exceeding a second value more than said threshold value is detected by the second detecting switch.

5. The charging apparatus according to claim 4, further comprising:
   a second cable receiving portion provided on a side of the proximal end of the charging cable;
   wherein the second detecting switch is provided on a distal end of the second cable receiving portion; and
   wherein the second detecting switch is operated when the second measuring cable and the second cable receiving portion are disconnected by the elongation of the charging cable exceeding the second value.

6. The charging apparatus according to claim 2, wherein a detected portion is provided on the measuring cable; and
   wherein the detecting switch is configured to detect a movement of the detected portion passing through the detecting switch due to the elongation of the charging cable exceeding the threshold value.

7. The charging apparatus according to claim 6, wherein a second detected portion is provided on the measuring cable;
   wherein the detecting switch is configured to detect a movement of the second detected portion passing through the detecting switch due to an elongation of the charging cable exceeding a second value more than said threshold value; and
   wherein the electric current control section is configured to start applying an electric current to the charging cable under a condition that the movement of the detected portion passing through the detecting switch is detected, and also to stop applying the electric current to the charging cable under a condition that the movement of the second detected portion passing through the detecting switch is detected.

8. The charging apparatus according to claim 1, further comprising:
   a lock unit that locks the connector to the main body so as to regulate a detachment of the connector from the main body; and an identification unit that unlocks the lock unit upon an identification establishment.

9. The charging apparatus according to claim 4, further comprising:

a lock unit that locks the connector to the main body so as to regulate a detachment of the connector from the main body; and an identification unit that unlocks the lock unit upon an identification establishment.

* * * * *